Aug. 20, 1946.                K. MILLER                 2,406,238
                             TWO-WAY CLUTCH
                       Original Filed Dec. 8, 1941
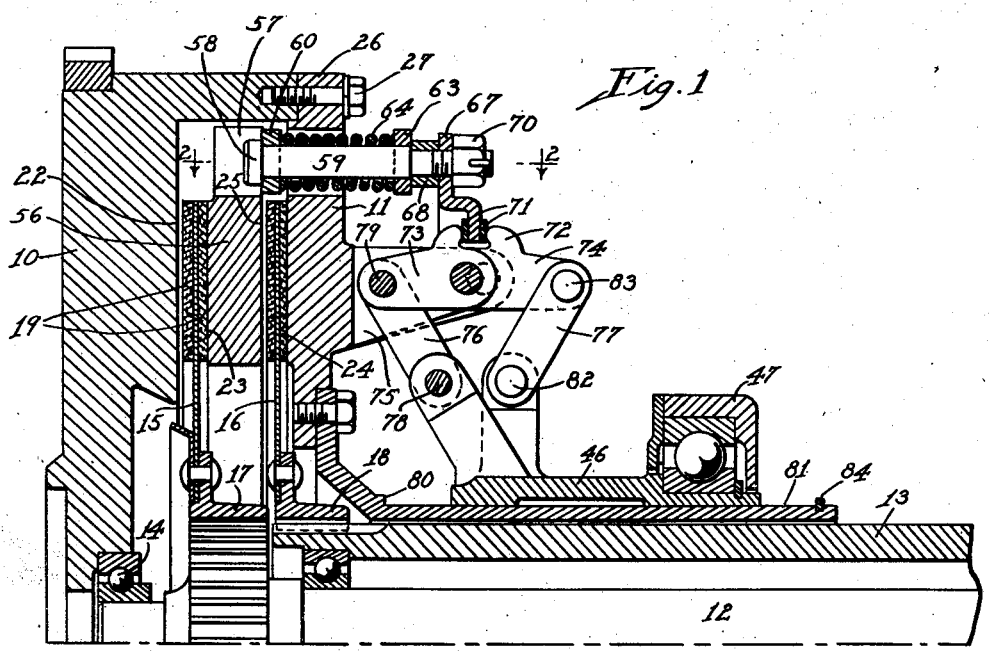
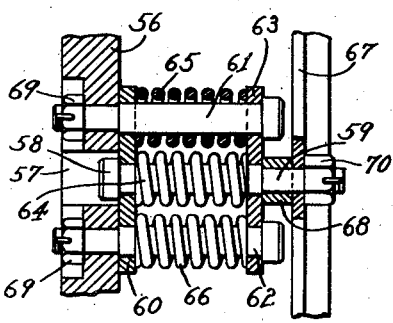
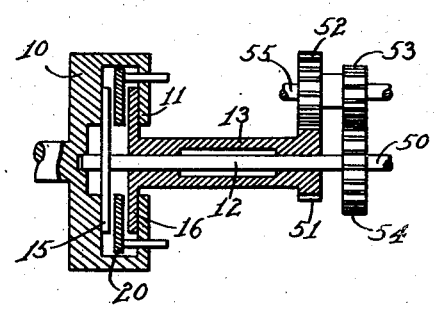
Inventor
Kay Miller
By McCanna, Wintercorn
   & Morsbach
            Attys.

Patented Aug. 20, 1946

2,406,238

UNITED STATES PATENT OFFICE 2,406,238

TWO-WAY CLUTCH

Kay Miller, Auburn, Ind., assignor to The Atwood Vacuum Machine Company, Rockford, Ill., a copartnership composed of Seth B. Atwood and James T. Atwood Original application December 8, 1941, Serial No. 422,045. Divided and this application November 17, 1943, Serial No. 510,577

9 Claims. (Cl. 192—48)

This application is a division of my copending application Serial No. 422,045, filed December 8, 1941.

This invention relates to friction clutches and is more particularly concerned with a new and improved two-way clutch especially designed for use with a two-rate transmission in a tractor, tank, truck, or the like, but of course, is suitable for other uses.

The principal object of my invention is to provide a friction clutch of the kind mentioned, in which a pressure plate is arranged to cooperate selectively with either of two clutch disks, the one driving a shaft associated with one gear train and the other driving a quill surrounding the shaft and associated with the other gear train, whereby when the one disk is engaged the other turns idly with its gear train, and vice versa, the purpose being to enable quick change in the drive ratio by merely shifting the clutch instead of having to shift gears in the transmission.

An important feature of the present invention consists in the provision of spring means cooperating with clutch actuating levers so as to apply spring pressure to the pressure plate in either direction, said spring means affording substantially constant pressure on the pressure plate in either position of clutch engagement and permitting movement past dead center position of the toggle linkage provided in certain forms for operating the actuating levers, whereby the clutch is automatically maintained in either engaged position under spring pressure until moved manually to neutral position or to the other engaged position.

The invention is illustrated in the accompanying drawing, in which—

Figure 1 is a longitudinal section through a two-way clutch made in accordance with my invention, half of the complete section being omitted to conserve space and permit showing the parts on a larger scale;

Fig. 2 is a sectional detail on the line 2—2 of Fig. 1, and

Fig. 3 is a diagrammatic illustration of the two-rate transmission in connection with which the clutch of my invention is employed.

The same reference numerals are applied to corresponding parts throughout the views.

Referring first to Figs. 1 and 2, the reference numeral 10 designates the flywheel of an engine, and 11 the back plate thereon. 12 is a driven shaft extending rearwardly from the flywheel adapted for direct connection with the propeller shaft or to be extended into the front end of the gear box of a transmission, and 13 is a quill surrounding the shaft and serving as an auxiliary driven member, the shaft 12 being for high ratio drive and the quill 13 for low ratio drive, as will soon appear. The shaft 12 has the usual pilot bearing 14 supporting the front end thereof at the center of the flywheel 10. 15 and 16 are clutch disks, the disk 15 having its center hub 17 splined on the front end of the shaft 12 to transmit drive from the flywheel to the shaft when the disk 15 is engaged, and the disk 16 having its hub 18 splined on the front end of the quill 13 to transmit drive from the flywheel to the quill when the disk 16 is engaged. At 19 are shown the usual pads or facings on the clutch disks, and at 56 is indicated a pressure plate between the two disks, adapted when moved forwardly to engage disk 15 with the driving face 22 on the back of the flywheel and the companion driving face 23 on the front of the pressure plate. The pressure plate is also movable rearwardly for engagement with disk 16 to cause engagement thereof with the driving face 24 on the back plate 11 and the companion driving face 25 on the back of the pressure plate. The pressure plate is suitably cast like the flywheel and back plate and the faces 22—25 are accurately machined on these cast parts to insure smooth clutch engagement. The back plate is suitably bolted to the flywheel by means of its marginal flange portion 26, as indicated at 27. 46 is the throw-out collar reciprocable relative to the quill 13 as by means of the anti-friction shifter ring 47. The latter is usually provided with trunnions for cooperation with a yoke, or other clutch operating means, not shown. Radial notches 57 are provided in the periphery of the pressure plate to accommodate the headed inner ends 58 of plunger rods 59 which are slidably engaged in holes in plates 60 mounted on the pressure plate on studs 61 and 62. The studs also support other plates 63 in spaced parallel relation to the plates 60, and the plungers 59 are slidably engaged in holes in those plates also. The plungers 59 carry coiled compression springs thereon between the plates 60 and 63, and the studs 61 and 62 carry other coiled compression springs 65 and 66 thereon between the same plates. The plungers 59, of which there are preferably six for the clutch in equally circumferentially spaced relation with respect to the back plate, each having associated therewith a pair of studs 61—62 on the pressure plate, are fastened rigidly to a stamped sheet metal ring 67 disposed in concentric relation with the back plate and pressure plate, spacer sleeves 68 being provided on the plungers 59 between the plates 63 and ring 67 to provide space between the plates 63 and the ring 67 for the heads of the studs 61—62. The tightening of the nuts 69 on the studs 61—62 and of the nuts 70 on the plungers 59 establish a predetermined preload spring pressure, and hence, when these springs are further compressed in the engagement of the clutch, the clutch is engaged under increased spring pressure. It should be clear from a study of Fig. 2 that when the ring 67 is moved in either direction, that is toward or away from the pressure plate 56 for engagement of the disk 15 or disk 16, the springs 64—66 can be compressed to cause the pressure plate to engage the disk under increased pressure, the plates 60 being moved to the right following engagement of the pressure plate 56 with the disk 16 to further compress the springs 64—66 so that the disk is engaged under such increased pressure, and the plates 63 being moved to the left following engagement of the pressure plate 56 with the disk 15 so that the disk is engaged under the increased spring pressure. The ring 67 has hardened steel wear segments 71 welded, or otherwise suitably secured, on the opposite sides thereof for engagement by fingers 72 provided on clutch actuating levers 73 and 74. These levers are pivotally mounted on lugs 75 cast integral with and projecting rearwardly from the back plate 11, and they have toggle links 76—77 pivotally connected to their outer ends for connecting the levers with the throw-out collar 46, to which the other ends of the toggle links are pivotally connected, as shown.

In operation, when the throw-out collar 46 is moved forwardly, the levers 73 are operated to move the pressure plate 56 rearwardly to engage the disk 16 under heavy spring pressure as a result of the further compression of the springs 64—66, in the manner previously described. The links 76 are arranged to move past a dead center position, namely, past a point where the pivots 78 are in the same plane with the pivots 79 normal to the axis of rotation, the movement over-center being limited in any suitable way, as by engagement of the front end of the throw-out collar with a shoulder 80 on the sleeve 81 mounted on the back plate and supporting the throw-out collar. In that way the spring pressure is made effective to hold the throw-out collar 46 yieldingly in the extreme position so as to avoid likelihood of accidental disengagement of the clutch. The fact that the springs 64—66 are further compressed in the engagement of the clutch disk is, however, principally of advantage from the standpoint that it insures substantially constant spring pressure being available to maintain clutch engagement and prevent slippage, regardless of the usual amount of wear on the clutch facings 19. When the throw-out collar 46 is moved rearwardly, the levers 74 are operated at the same time that the levers 73 are retracted relative to the ring 67, and the pressure plate 56 is accordingly moved to engage the clutch disk 15. Here again the springs 64—66 are subjected to further compression in the engagement of the clutch in a similar manner and for the same reasons previously mentioned, the links 77 being movable past a dead center position where the pivots 82 are in the same plane with the pivots 83 normal to the axis of rotation. A split ring 84 on the rear end of the sleeve 81 limits the rearward movement of the throw-out collar after the links 77 have been moved over center.

This clutch, as previously indicated, is used in conjunction with a two-rate transmission, where the shaft 12, as shown in Fig. 3, extends rearwardly from the clutch and has the rear end portion 50 either directly connected through a universal joint with the propeller shaft of the tractor, truck, tank, or other vehicle, or extended into the front end of the gear box of a change speed transmission providing any desired number of speeds for forward and reverse drive. The quill 13, which provides the low ratio drive, has a gear 51 on the rear end thereof meshing with the larger gear 52 of a two-gear cluster, the smaller gear 53 of which meshes with a large gear 54 on the shaft 12, whereby to drive the shaft 12 at a reduced speed when the disk 16 on the quill 13 is engaged. The cluster 52—53 is supported on a spindle 55 suitably mounted in spaced parallel relation to the shaft 12 and quill 13. Of course, when the disk 15 on the shaft 12 is engaged, the quill 13 and disk 16 are driven idly by reason of the reduction gearing connection with the shaft 12. Forward movement of the throw-out collar 46 by means of a manually operable clutch pedal or lever (not shown) causes engagement of the disk 15. When the throw-out collar 46 is moved rearwardly by means of a manually operable clutch pedal or lever, the disk 16 is engaged. The springs 64—66, in addition to providing resilient engagement so that close adjustment is not required even though the clutch is of the over-center type, provide substantially constant pressure and accordingly non-slipping engagement regardless of the usual wear on the clutch facings 19. In addition the springs, as previously described, act to hold the throw-out collar 46 resiliently in either extreme position to avoid likelihood of accidental disengagement of the clutch.

It is believed the foregoing description conveys a good understanding of the objects and advantages of my invention. The appended claims have been drawn to cover all legitimate modifications and adaptations.

I claim:

1. In a friction clutch, the combination with a flywheel constituting the driving element and a back plate in fixed axially spaced relation to the flywheel and turning therewith, of two separate and independent clutch disks between the flywheel and back plate constituting the driven elements, a pressure plate between said disks turning with the flywheel and back plate and movable in either direction from a neutral position for driving engagement with either of said disks, means driven by each of said clutch disks, a single ring in concentric relation to said plates and guided for limited axial movement with respect to the pressure plate, a plurality of coiled compression springs in circumferentially spaced relation to said ring and plate and compressed therebetween in preloaded condition and arranged to apply increased spring pressure to the plate upon axial movement of the ring relative to the plate to either clutch engaging position, and positive acting over-center means between the back plate and said ring to move the pressure plate in either direction relative to the back plate and further compress said springs so as to engage the clutch resiliently under increased spring pressure.

2. In a friction clutch, the combination of a flywheel constituting the driving element, a back plate for the flywheel, two separate and independent clutch disks constituting the driven elements, one arranged to engage the flywheel and the other arranged to engage the back plate, a pressure plate turning with the back plate and disposed between said disks to engage either disk selectively, means driven by each of said clutch disks, resilient means carried on the pressure plate and adapted to be stressed with respect to the pressure plate, positive acting over-center means for moving the pressure plate in either direction to engage the clutch, and a single intermediate ring for transmitting movement from the over-center means to said resilient means in either direction, whereby to stress said resilient means and accordingly engage the clutch resiliently in either direction.

3. In a friction clutch, the combination of a flywheel constituting the driving element, a back plate for the flywheel, two separate and independent clutch disks constituting the driven elements, one arranged to engage the flywheel and the other arranged to engage the back plate, a pressure plate turning with the back plate and disposed between said disks to engage either disk selectively, means driven by each of said clutch disks, a cluster of springs carried on the back plate, said cluster including a plurality of coiled compression springs, a pair of plates between which said springs are caged, studs for supporting said cage plates on the pressure plate for sliding movement relative to the studs, a plunger extending through the cage plates and operatively associated therewith to move either of said plates toward the other upon movement of the plunger in one direction or the other, and clutch engaging means cooperating with the aforesaid plunger for moving the pressure plate in either direction, whereby to engage the clutch resiliently in either direction.

4. A friction clutch as set forth in claim 3, wherein said clutch engaging means comprises a positive acting lever means, the clutch including a manually reciprocable throw-out collar, toggle links connecting said throw-out collar to said positive acting lever means, and means for limiting movement of the throw-out collar in either direction so as to permit only a predetermined movement of said links past dead center positions when the throw-out collar is moved to its opposite extreme positions.

5. In a friction clutch, the combination with a flywheel constituting the driving element and a back plate in fixed axially spaced relation to the flywheel and turning therewith, of two separate and independent clutch disks between the flywheel and back plate constituting the driven elements, a pressure plate between said disks turning with the flywheel and back plate and movable in either direction from a neutral position for driving engagement with either of said disks, means driven by each of said clutch disks, a single ring in concentric relation to said plates and guided for limited axial movement with respect to the pressure plate, a plurality of coiled compression springs in circumferentially spaced relation to said ring and plate and compressed therebetween in preloaded condition and arranged to apply increased spring pressure to the plate upon axial movement of the ring relative to the plate to either clutch engaging position, and clutch engaging means cooperating with said ring to move the pressure plate in either direction relative to the back plate and further compress said springs so as to engage the clutch resiliently under increased spring pressure.

6. In a friction clutch, the combination of a flywheel constituting the driving element, a back plate for the flywheel, two separate and independent clutch disks constituting the driven elements, one arranged to engage the flywheel and the other arranged to engage the back plate, a pressure plate turning with the back plate and disposed between said disks to engage either disk selectively, means driven by each of said clutch disks, resilient means carried on the pressure plate and adapted to be stressed with respect to the pressure plate, clutch engaging means for moving the pressure plate in either direction, and a single intermediate ring for transmitting movement from the clutch engaging means to said resilient means in either direction, whereby to stress said resilient means and accordingly engage the clutch resiliently in either direction.

7. In a friction clutch comprising a flywheel constituting the driving element, one or more clutch disks constituting the driven element, and a pressure plate for engaging the driving and driven elements, clutch actuating means comprising a single ring in concentric relation to said plate and guided for limited axial movement with respect thereto, a plurality of coiled compression springs in circumferentially spaced relation to said ring and plate and compressed therebetween in preloaded condition and arranged to apply increased spring pressure to the plate upon axial movement of the ring relative to the plate to clutch engaging position, and positive acting over-center means between the back plate and said ring to move the pressure plate relative to the back plate and further compress said springs so as to engage the clutch resiliently under increased spring pressure.

8. In a friction clutch comprising a flywheel constituting the driving element, a back plate for the flywheel, one or more clutch disks constituting the driven element, and a pressure plate turning with the back plate and arranged to cause engagement of said driving and driven elements, clutch actuating means comprising a cluster of springs carried on the pressure plate, said cluster including a plurality of coiled compression springs, a pair of plates between which said springs are caged, studs for supporting said cage plates on the pressure plate for sliding movement relative to the studs, and a plunger extending through the cage plates and operatively associated therewith to move either of said plates toward the other upon movement of the plunger in one direction or the other, and clutch engaging means cooperating with the aforesaid plunger for moving the pressure plate in either direction.

9. A clutch mechanism as set forth in claim 8, wherein said clutch engaging means comprises a positive acting lever means, the clutch including a manually reciprocable throw-out collar, toggle links connecting said throw-out collar to said positive acting lever means, and means for limiting movement of the throw-out collar in either direction so as to permit only a predetermined movement of said links past dead center positions when the throw-out collar is moved to its opposite extreme positions.

KAY MILLER.